United States Patent
Jang

(10) Patent No.: US 6,519,444 B1
(45) Date of Patent: Feb. 11, 2003

(54) AUDIO-VISUAL EDUCATION SYSTEM USING MOVABLE TOYS

(76) Inventor: Geung Dug Jang, 75-1 San, Daemang-1-dong, Goa-eup, Kumi-shi, Kyungsangbukdo (KR), 730-810

(*) Notice: Subject to any disclaimer, the term of this patent is extended or adjusted under 35 U.S.C. 154(b) by 0 days.

(21) Appl. No.: 09/857,531
(22) PCT Filed: Feb. 20, 1999
(86) PCT No.: PCT/KR99/00080
§ 371 (c)(1),
(2), (4) Date: Jun. 6, 2001
(87) PCT Pub. No.: WO00/36576
PCT Pub. Date: Jun. 22, 2000

(30) Foreign Application Priority Data

Dec. 17, 1998 (KR) .............................. 98-55650

(51) Int. Cl.⁷ ..................... A63H 30/04; G09B 19/00
(52) U.S. Cl. ..................... 434/308; 446/301
(58) Field of Search ............... 434/308, 316, 434/318, 321, 86, 307; 446/297, 300, 301, 303, 337

(56) References Cited

U.S. PATENT DOCUMENTS

| | | | |
|---|---|---|---|
| 4,701,681 A | * 10/1987 | Koike ..................... 318/16 |
| 5,191,615 A | * 3/1993 | Aldava et al. ............... 348/485 |
| 5,524,326 A | 6/1996 | Markowitz .................. 119/707 |
| 5,655,945 A | * 8/1997 | Jani ........................... 386/96 |
| 6,238,262 B1 | * 5/2001 | Pracas ........................ 434/308 |

FOREIGN PATENT DOCUMENTS

GB  2226961  12/1989

* cited by examiner

Primary Examiner—Hieu T. Vo
(74) Attorney, Agent, or Firm—Madson & Metcalf

(57) ABSTRACT

An audio-visual education system using movable toys is disclosed. The system includes a multichannel radio transmitter mounted on a stereo output terminal of a sound signal regenerative apparatus, the radio transmitter separates sound signals, call signals, and movement control signals corresponding to specific movable toys and radio transmitting each of the signals. The moveable toys move their mouth, hands, feet, or body. A radio receiver is mounted in each movable toy. The radio receiver receives signals from the radio transmitter and controls the sound and movement of the relevant portion of the movable toy according to the received signals. A speaker is mounted in each movable toy for outputting the sound signal received from the radio receiver.

9 Claims, 2 Drawing Sheets

AUDIO-VISUAL EDUCATION SYSTEM USING MOVABLE TOYS

BACKGROUND

1. The Field of the Invention

This invention relates to an audio-visual education system using movable toys, which allow complex sound signals to be output from a plurality of movable toys respectively or simultaneously and relevant movable toys to respectively or simultaneously perform movements corresponding to the sound signals during output of the sound signals, or to perform the movements regardless of output of the sound signals, thus steeply improving an educational effect and an audio-visual effect.

2. The Background Art

In general, there are many sound signal regenerative apparatuses such as a tape recorder, a VCR, a CD player, a computer, and the likes. However, they have only a function to regenerate sound signals recorded on a recording medium and output the sound signals through a speaker. Since various sound signals recorded on the recording medium are all output through only one speaker, for example, if contents recorded on the recording medium, i.e., conversation of many people or speech of drama, are regenerated through one of the sound signal regenerative apparatuses, it is impossible to exactly know who speaks now.

Meanwhile, since conventional movable toys provide only fixed and limited movements and sounds and can't provide various movements and sounds suitable for time and situation, they can't provide users with the feeling of movement and the sense for the real.

BRIEF SUMMARY AND OBJECTS OF THE INVENTION

In view of the foregoing, it is a primary object of the present invention to provide an improved audio visual education system using movable toys, which allow complex sound signals to be output from a plurality of movable toys respectively or simultaneously and relevant movable toys to respectively or simultaneously perform movements corresponding to the sound signals during output of the sound signals, or to perform the movements regardless of output of the sound signals, thus steeply improving an educational effect and an audio-visual effect.

The foregoing object is accomplished by providing an audio-visual education system using movable toys, the system having a typical sound signal regenerative apparatus for regenerating sound signals and various control signals recorded on a recording medium; a multichannel radio transmitter 2 which is mounted on a stereo output terminal of the sound signal regenerative apparatus, the radio transmitter 2 separating sound signals, and call signals and movement control signals on specific movable toys, and emitting each of the signals in the air; a plurality of movable toys manufactured to move their mouth, hands, feet, or all body by power; a plurality of radio receivers respectively mounted in each of the movable toys, the radio receivers for receiving the signals emitted from the radio transmitter and for controlling the relevant movable toy according to the received signals to output sound signals and/or move at least one or more portions of the toy's body when the relevant movable toy is called by the call signal from the radio transmitter; and a plurality of speakers respectively munted in each of the movable toys, the speakers for outputting the sound signal received from the radio receiver.

When users hear conversation, drama, or chorus through this system, the plurality of movable toys output sound signals different from each other separately or simultaneously, and also perform movements corresponding to the sound signals during output of the sound signals. Furthermore, each of the movable toys can also move regardless of output of the sound signals. Thus providing improved audio-visual educational effect and the feeling of movement.

The foregoing and other objects and features of the present invention will become more fully apparent to persons of ordinary skill in the art from the following description and appended claims, taken in conjunction with the accompanying drawings.

BRIEF DESCRIPTION OF THE DRAWINGS

Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PREFERRED EMBODIMENTS

Figure 1:
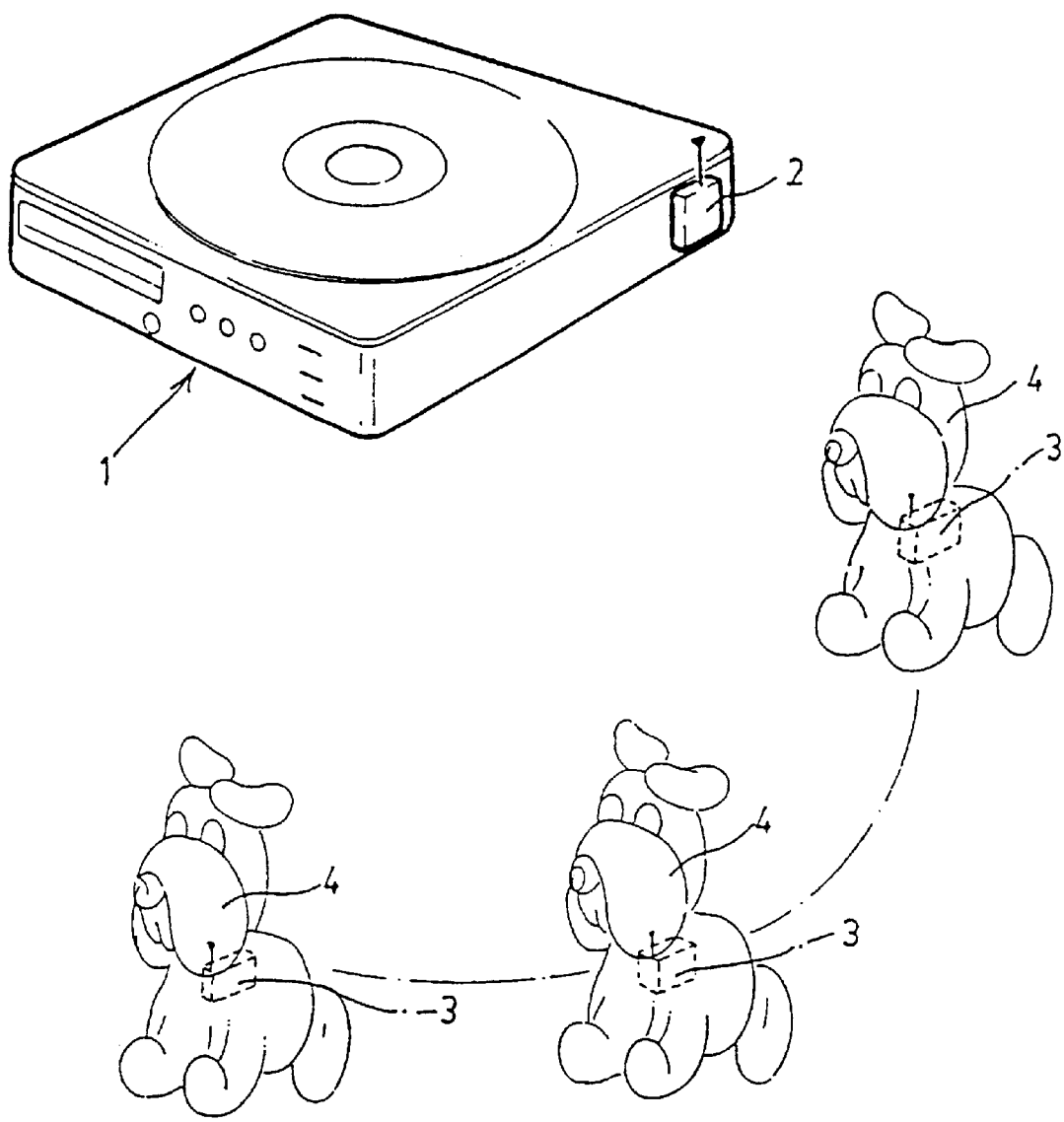
FIG. 1 is a general diagrammatic view of this invention.
Figure 2:
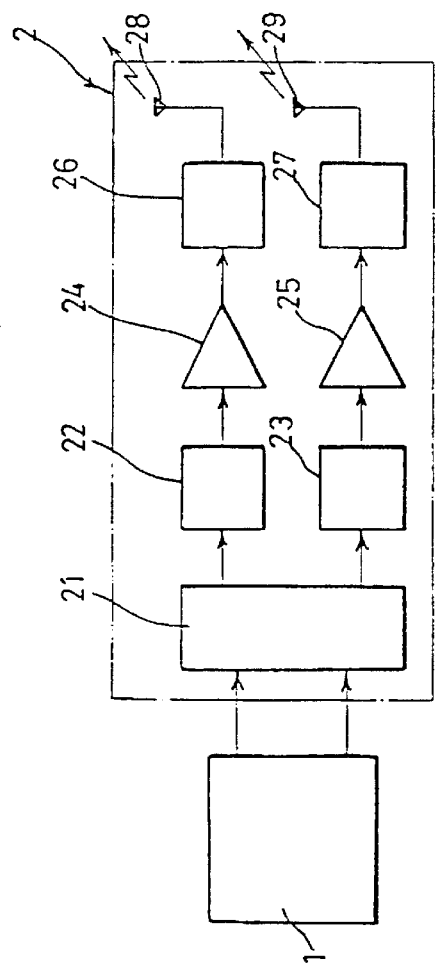
FIG. 2 is a detailed block diagram of this invention.
Figure 2:
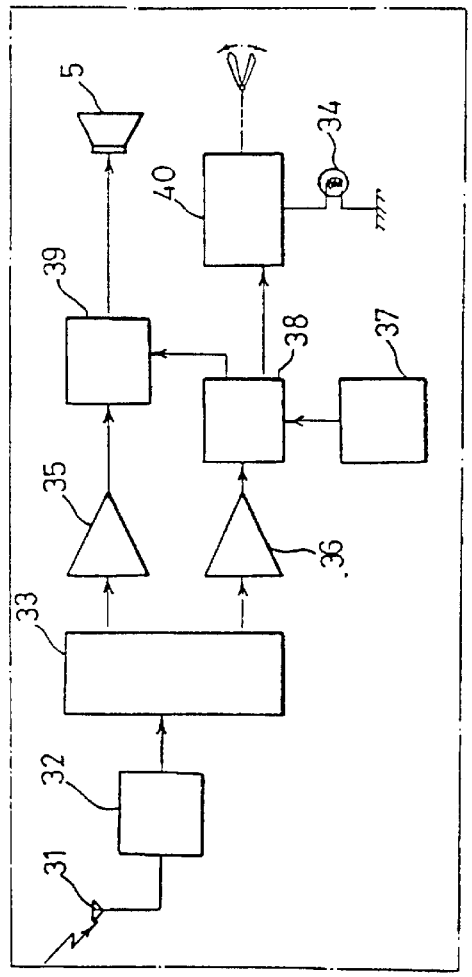

It will be readily understood that the components and steps of the present invention, as generally described and illustrated in the Figures herein and accompanying text, could be arranged and designed in a wide variety of different configurations while still utilizing the inventive concept. Thus, the following more detailed description of the preferred embodiments of the system of the present invention is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Referring now to the drawings, a multichannel radio transmitter 2 which separates sound signals, and call signals and movement control signals on specific movable toys and emits the signals into the air is mounted on a stereo output terminal of a sound signal regenerative apparatus 1. The multichannel radio transmitter 2 of the present invention may be used in known typical sound signals regenerative apparatuses. A plurality of movable toys 4 can move their mouth, hands, feet individually or all together by power. Each of the movable toys 4 has a radio receiver 3 and a speaker 5 therein. Each of the radio receivers 3 mounted in each of the movable toys 4 receives the sound signals, the call signals and the movement control signals emitted from the radio transmitter 2. If the radio receivers 3 are called by the call signal from the radio transmitter 2, only the called radio receivers of the radio receivers 3 mounted in the movable toys 4 output relevant sound signal and move at least one or more portions of the toys'body according to the movement control signal during output of the sound signal or regardless of the sound signal.

The radio transmitter 2 comprises a first signal separator 21 for separating analog sound signals and digital call signals and movement control signals from complex output signals output from the stereo output terminal of the sound signal regenerative apparatus 1; a first and a second RF modulators 22 and 23 for converting the analog sound signals and the digital call signals and movement control signals output from two output terminals of the first signal separator 21 into radio frequency; a first and a second amplifiers 24 and 25 for amplifying each of the signals converted into radio frequency to a prescribed level; and a first and a second radio output units 26 and 27 for emitting each of the output signals from the first and second amplifiers 24 and 25 through antennas 28 and 29.

Each of the radio receiver 3 mounted in each of the movable toys 4 comprises a RF receiving unit 32 for receiving the sound signal, and call signal and movement control signal on the specific toys through an antenna 31; a second separator 33 for separating the complex output signals provided from the RF receiving unit 32 into sound signal and call signal and movement control signal; a third and a forth amplifiers 35 and 36 for amplifying each of the signals of radio frequency to a prescribed level; a call data setting unit 37 for allowing an user to previously set a desired call data from the various call datum output from the radio transmitter 2; a control signal generating unit 38 for providing an operation signal when the call data from the forth amplifier 36 and the call data previously set by the call data setting unit 37 are identical with each other; a speaker output control unit 39 for providing the sound signal amplified by the third amplifier 35 to the speaker 5 when the prescribed operation signal is provided from the control signal generating unit 38; and a movable toy operating unit 40 for moving the toy's body partially or all together according to the movement control signal received from the radio transmitter 2 under control of the control signal generating unit 38.

A lamp 34 is attached on a output terminal of the movable toy operating unit 40. Preferably, the lamp 34 is attached to be exposed outside the movable toy so that the lamp 34 indicates that the movable toy is under operation when the prescribed sound signal is output.

The radio transmitter 2 including the first signal separator 21, the first and second RF modulators 22 and 23, the first and second amplifiers 24 and 25, the first and second radio output units 26 and 27, and the first and second antennas 28 and 29 can be mounted inside various sound signal regenerative apparatuses 1, for example, a tape recorder, a VCR, a CD player, and a computer or can be removably mounted outside one of the sound signal regenerative apparatuses 1. In case of mounting the radio transmitter 2 inside the sound signal regenerative apparatus 1, the stereo output terminal of the sound signal regenerative apparatus 1 is connected to an input terminal of the signal separator 21. In case of mounting the radio transmitter 2 outside the sound signal regenerative apparatus 1, the radio transmitter 2 is connected by a stereo terminal connecting jack such as a speaker jack or an earphone jack formed on a case of the radio transmitter 2.

Each of the radio receivers 3 including the RF receiving unit 32, the second signal separator 33, the third and forth amplifiers 35 and 36, the call data setting unit 37, the control signal generating unit 38, the speaker output control unit 39, and the movable toy operating unit 40 can be mounted inside or outside each of the movable toys 4 after previously setting desired call data by the call data setting unit 37. Each of the speakers 5 is also mounted inside or outside each of the movable toys 4.

In order to operate this system, it is essential that when recording the signals on a recording medium, all sound signals must be recorded into analog signal and division of each of the sound signals, the call signals and the movement control signals must be recorded into digital signal. For example, when using a magnetic tape, sound signals are recorded on L-Ch into analog type and call signals and movement control signals are recorded on R-Ch into digital type.

When the complex sound signals, and the various datum recorded on the recording medium as the above are regenerated, the signals and the datum are input through two stereo output terminals into the first signal separator 21 of the radio transmitter 2 to be separated sound signals, and call signals and movement control signals.

The sound signals separated by the first signal separator 21 are converted into radio frequency through the first RF modulator 22, amplified through the first amplifier 24 into the prescribed level, and then, emitted through the first radio output unit 26 and the antenna 28 into the air. The call signals and the movement control signals separated by the first signal separator 21 are also converted through the second RF modulator 23 into radio frequency, amplified through the second amplifier 25 into the prescribed level, and then, emitted through the second radio output unit 27 and the antenna 29 into the air.

When the sound signals, and the call signals and the movement control signals are emitted into the air, each of the radio receivers 3 mounted in each of the movable toys 4 receives them through the RF receiving unit 32 connected to the antenna 31 and provides to the second signal separator 33.

The second signal separator 33 separates the sound signals and the call signals and movement control signals from the complex output signals provided through the RF receiving unit 32 and provides to the third and forth amplifiers 35 and 36. The third and forth amplifiers 35 and 36 amplify each of the signals of radio frequency into the prescribed level respectively.

Each of the radio receivers 3 to be mounted in each of the movable toys is previously set to have the desired call data by the call data setting unit 37. The call data setting unit 37 usually includes a plurality of dip switches. The control signal generating unit 38 receiving the call signal from the forth amplifier 36 compares whether or not the received call data is identical with the previously set call data. If the datum are not identical with each other, the control signal generating unit 38 provides the speaker output control unit 39 with mute signal so as to prevent the sound signal provided from the third amplifier 35 from being transmitted to the speaker 5 and also provides the movable toy operating unit 40 with non-operation signal so as to prevent the operation of the movable toy.

As a result of comparison, if the datum are identical with each other, according to datum received subsequently, the control signal generating unit 38 determines whether it operates only the speaker 5, or controls only the movement of the movable toy without the operation of the speaker 5, or operates not only the speaker 5 but also the movement of the movable toy. According to the result of determination, the control signal generating unit 38 selectively provides the speaker output control unit 39 and the movable toy operating unit 40 with the operation signal.

That is, as the result of comparison at the control signal generating unit 38, when the call data received from the forth amplifier 36 is identical with the call data previously set by the call data setting unit 37 and the control signal generating unit 38 receives data requiring the output of the sound signal, the control signal generating unit 38 provides the speaker output control unit 39 with the operating signal so that the sound signal amplified by the third amplifier 35 is output through the speaker 5, and when receiving data requiring the output of the movement control signal during output of the sound signal or regardless of output of sound signal, the control signal generating unit 38 provides the movable toy operating unit 40 with the operation signal. Therefore, Each of the movable toys receiving the operation signal moves at least one or more of portions of the toy's body corresponding to the movement control signal received from the radio transmitter 2.

According to the present invention, this system increases audio-visual effect and educational effect since users can easily know which of the movable toys makes sounds or which of the movable toys is operated.

In other words, each of the movable toys employing this system is adapted to make sounds and/or to move at least one or more portions of its body according to the call data from the radio transmitter 2. The movable toys called by the call data may respectively or all together move at least one or more portions of the body with or without sounds. Additionally, one or more the called movable toys may individually or simultaneously output the sound signals.

If the plurality of the movable toys having respectively the radio receiver 3 which include call datum different from each other are properly arranged and a setting is properly set, this system can provide almost the same effect as a puppet performance.

The present invention also has two-way digital information processing capability and allows the sound data containing image and motion information to be transmitted to the specific movable toys in the form of radio information to perform movements, for example, talk, sing and move their mouth, hands, feet, or all body in accordance with the sound signals to be received, in a digital broadcasting system or watching an educational program for children on TV or VCR, whereby children can easily understand stories, learn music/rhythm and empathy or improve their mind concentration ability.

Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. An audio-visual education system using movable toys, the system comprising:
    a sound signal regenerative apparatus for regenerating sound signals and various control signals recorded on a recording medium;
    a plurality of movable toys manufactured to move their mouth, hands, feet, or body by power;
    a multichannel radio transmitter mounted on a stereo output terminal of the sound signal regenerative apparatus, the radio transmitter separating sound signals, call signals, and movement control signals on specific movable toys, and radio transmitting the signals, wherein the radio transmitter includes:
        a first signal separator for separating analog sound signals and digital call signals and movement control signals from complex output signals output from the stereo output terminal of the sound signal regenerative apparatus;
        a first and a second RF modulator for converting the analog sound signals and the digital call signals and the movement control signals, respectively output from output terminals of the first signal separator, into radio frequency;
        a first and a second amplifier for amplifying each of the signals converted into radio frequency to a prescribed level; and
        a first and a second radio output unit for transmitting each of the output signals from the first and second amplifiers through antennas;
    a radio receiver mounted in each of the movable toys, the radio receiver configured to receive the signals transmitted from the radio transmitter, the radio receiver configured to control the specific movable toy according to the received signals to output sound signals and/or move at least one of the toy's mouth, hands, feet, or body when the specific movable toy is called by the call signal from the radio transmitter; and
    a speaker mounted in each of the movable toys for outputting the sound signal received from the radio receiver.

2. An audio-visual education system using movable toys as recited in claim 1, wherein the radio transmitter can be mounted inside the sound signal regenerative apparatus or can be removably mounted outside the sound signal regenerative apparatus.

3. An audio-visual education system using movable toys as recited in claim 1, wherein each of the speakers can be mounted inside or outside each of the movable toys.

4. An audio-visual education system using movable toys, the system comprising:
    a sound signal regenerative apparatus for regenerating sound signals and various control signals recorded on a recording medium;
    a plurality of movable toys manufactured to move their mouth, hands, feet, or body by power;
    a multichannel radio transmitter mounted on a stereo output terminal of the sound signal regenerative apparatus, the radio transmitter separating sound signals, call signals, and movement control signals on specific movable toys, and radio transmitting the signals;
    a radio receiver mounted in each of the movable toys, the radio receiver configured to receive the signals transmitted from the radio transmitter, the radio receiver configured to control the specific movable toy according to the received signals to output sound signals and/or move at least one of the toy's mouth, hands, feet, or body when the specific movable toy is called by the call signal from the radio transmitter, wherein the radio receiver includes:
        a RF receiving unit for receiving the sound signal, call signal, and movement control signal on the specific movable toy through an antenna;
        a second separator for separating the complex output signals provided from the RF receiving unit into sound signals, call signals, and movement control signals;
        a third and a forth amplifier for amplifying each of the signals of radio frequency to a prescribed level;
        a call data setting unit for allowing a user to previously set a desired call data from the various call datum output from the radio transmitter;
        a control signal generating unit for providing an operation signal when the call data from the forth amplifier and the call data previously set by the call data setting unit are identical with each other;

a speaker output control unit for providing the sound signal amplified by the third amplifier to the speaker when the prescribed operation signal is provided from the control signal generating unit; and a movable toy operating unit for moving the toy's body partially or all together according to the movement control signal received from the radio transmitter under control of the control signal generating unit; and a speaker mounted in each of the movable toys for outputting the sound signal received from the radio receiver.

5. An audio-visual education system using movable toys as recited in claim 4, wherein each of the radio receivers is previously set to have a desired call data by the call data setting unit before mounting in the movable toy.

6. An audio-visual education system using movable toys as recited in claim 4, wherein when the radio receivers are called by the call signal from the radio transmitter, only the called radio receivers of the radio receivers output relevant sound signal and move at least one or more portions of the toys' body according to the movement control signal during output of the sound signal or regardless of the sound signal.

7. An audio-visual education system using movable toys as recited in claim 4, wherein each of the radio receivers can be mounted inside or outside each of the movable toys after previously setting desired call data by the call data setting unit.

8. An audio-visual education system using movable toys as recited in claim 4, wherein each of the speakers can be mounted inside or outside each of the movable toys.

9. An audio-visual education system using movable toys as recited in claim 4, wherein the radio transmitter includes:

a first signal separator for separating analog sound signals and digital call signals and movement control signals from complex output signals output from the stereo output terminal of the sound signal regenerative apparatus;

a first and a second RF modulator for converting the analog sound signals and the digital call signals and the movement control signals, respectively output from output terminals of the first signal separator, into radio frequency;

a first and a second amplifier for amplifying each of the signals converted into radio frequency to a prescribed level; and a first and a second radio output unit for transmitting each of the output signals from the first and second amplifiers through antennas.

* * * * *